United States Patent
Ito et al.

(10) Patent No.: US 7,590,697 B2
(45) Date of Patent: Sep. 15, 2009

(54) MAIL SERVER, MOBILE COMMUNICATION SYSTEM, AND PROGRAM THEREFOR

(75) Inventors: Takashi Ito, Saitama (JP); Shikiko Kawano, Funabashi (JP)

(73) Assignee: NTT DoCoMo, Inc., Tokyo (JP)

( * ) Notice: Subject to any disclaimer, the term of this patent is extended or adjusted under 35 U.S.C. 154(b) by 611 days.

(21) Appl. No.: 10/978,620

(22) Filed: Nov. 1, 2004

(65) Prior Publication Data

US 2005/0120085 A1 Jun. 2, 2005

(30) Foreign Application Priority Data

Nov. 4, 2003 (JP) ............................. 2003-374930

(51) Int. Cl.
*G06F 15/16* (2006.01)
(52) U.S. Cl. .................. 709/206; 709/204; 709/207; 370/260; 707/10
(58) Field of Classification Search .............. 709/203, 709/206, 207, 204; 370/260; 707/10, 100
See application file for complete search history.

(56) References Cited

U.S. PATENT DOCUMENTS

| | | | | |
|---|---|---|---|---|
| 6,507,866 | B1 * | 1/2003 | Barchi | 709/207 |
| 6,615,241 | B1 | 9/2003 | Miller et al. | |
| 6,779,021 | B1 * | 8/2004 | Bates et al. | 709/206 |
| 6,931,433 | B1 * | 8/2005 | Ralston et al. | 709/206 |
| 7,277,695 | B2 * | 10/2007 | Petry et al. | 455/414.1 |
| 2002/0029454 | A1 * | 3/2002 | Duvall et al. | 29/426.4 |
| 2002/0059454 | A1 | 5/2002 | Barrett et al. | |
| 2003/0229671 | A1 * | 12/2003 | Kadomatsu et al. | 709/206 |
| 2005/0188036 | A1 * | 8/2005 | Yasuda | 709/206 |
| 2005/0198142 | A1 | 9/2005 | Yamakami | |

FOREIGN PATENT DOCUMENTS

| | | |
|---|---|---|
| JP | 2003-046578 A | 2/2003 |
| JP | 2003-87327 A | 3/2003 |
| JP | 2003-115925 A | 4/2003 |
| WO | WO 02/28127 | 4/2002 |
| WO | WO 03/071753 A1 | 8/2003 |

OTHER PUBLICATIONS

Patent Abstract of Japan, Publication No. 2003-115925 A, Apr. 18, 2003, 1 page.
Korean Office Action mailed Jun. 29, 2006.
Chinese Office Action, CN App. No. 200410087188.4, Sep. 1, 2006.
Japanese Office Action issued Mar. 18, 2008 in Japanese Patent Application No. 2003-374930 (with translation).
Decision for Rejection issued Jun. 3, 2008 in Japanese Patent Application No. 2003-374930 (with translation).

* cited by examiner

*Primary Examiner*—Thu Ha T Nguyen
(74) *Attorney, Agent, or Firm*—Brinks Hofer Gilson and Lione

(57) ABSTRACT

The present invention provides a technique for regulating the distribution of bulk and unsolicited e-mails without hampering convenience for both source and destination mail clients as much as possible. According to this technique, if the number of e-mails sent from either of mobile phones 10a to 10c exceeds a predetermined threshold, only e-mails which are addressed to specific mail addresses pre-stored in mail server 30 are disposed of.

8 Claims, 6 Drawing Sheets

| MAIL ADDRESS | SERVICE REGISTRATION FLAG | USER NAME | TELEPHONE NUMBER | ⋮ |
|---|---|---|---|---|
| matsu@abc.co.jp | ON | ⋮ | ⋮ | ⋮ |
| toshi@abc.co.jp | OFF | ⋮ | ⋮ | ⋮ |
| kei@abc.co.jp | ON | ⋮ | ⋮ | ⋮ |
| aki@abc.co.jp | OFF | ⋮ | ⋮ | ⋮ |
| kayo@abc.co.jp | OFF | ⋮ | ⋮ | ⋮ |
| ⋮ | ⋮ | ⋮ | ⋮ | ⋮ |

| MAIL ADDRESS | MAIL NUMBER | MAIL NUMBER COUNT START DAY IDENTIFIER | THRESHOLD-EXCEEDED FLAG | THRESHOLD-EXCEEDED FLAG ON SETTING DAY IDENTIFIER |
|---|---|---|---|---|
| matsu@abc.co.jp | 99 | 4 | OFF | --- |
| toshi@abc.co.jp | 250 | 4 | ON | 4 |
| kei@abc.co.jp | 15 | 3 | OFF | --- |
| aki@abc.co.jp | 2 | 4 | OFF | --- |
| kayo@abc.co.jp | 0 | 4 | OFF | --- |
| ... | ... | ... | ... | ... |
| ... | ... | ... | ... | ... |
| ... | ... | ... | ... | ... |
| ... | ... | ... | ... | ... |

| MAIL ADDRESS | MAIL NUMBER | MAIL NUMBER COUNT START DAY IDENTIFIER | THRESHOLD-EXCEEDED FLAG | THRESHOLD-EXCEEDED FLAG ON SETTING DAY IDENTIFIER |
|---|---|---|---|---|
| matsu@abc.co.jp | (99)→100 | 4 | (OFF)→ON | 4 |
| toshi@abc.co.jp | 250 | 4 | ON | 4 |
| kei@abc.co.jp | 15 | 3 | OFF | ---- |
| aki@abc.co.jp | 2 | 4 | OFF | ---- |
| kayo@abc.co.jp | 0 | 4 | OFF | ---- |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

↙ CT

MAIL SERVER, MOBILE COMMUNICATION SYSTEM, AND PROGRAM THEREFOR

This application claims priority under 35 U.S.C. §119 to Japanese Patent Application No. 2003-374930 filed Nov. 4, 2003, the entire content of which is hereby incorporated by reference.

The present invention relates to a technique for regulating distribution of bulk and unsolicited e-mail.

BACKGROUND ART

Distribution of bulk and unsolicited e-mail to randomly selected mail clients for purposes of mainly advertising or soliciting is becoming increasingly problematic for mail clients. Moreover, in a system where a mobile phone is a mail client, there is the added problem of the mail client incurring unnecessary costs since communication charges for receiving e-mails are paid by the owners of mobile phones that are the recipients of such e-mails. To counter the problem of bulk and unsolicited mail, measures to prevent their distribution have been proposed.

For example, Japanese Patent Application Laid-Open Publication No. 2003-115925 proposes a technique where a source address of an e-mail is extracted and counted. If a number of e-mails sent from an identical source address to a mail box within a predetermined time period becomes equal to or greater than a predetermined threshold number, a determination is made that the mails are unsolicited and are consequently deleted from the mailbox. However, in a large organization such as a corporation, it is not unusual for hundreds or thousands of e-mails to be received during the course of a single day for business communication. Moreover, it is now common practice for publications such as newsletters to be simultaneously bulk-distributed to a large number of subscribers. Under such circumstances, if as described above a predetermined threshold is used to determine whether e-mail is unsolicited, a genuine e-mail may be prevented from being received by the intended recipient.

In view of the problem described above, Japanese Patent Application Laid-Open Publication No. 2003-46578, for example, proposes a technique for determining if a number of e-mails sent from an identical source address exceeds a certain threshold number. In the case that the threshold is exceeded, it is determined whether the addressee of the mails wishes to receive the mails, and if not so, the mails are deleted from the mail box. However, making such determinations is complicated and time-consuming for users.

BRIEF SUMMARY

The present invention has been made in view of the problems stated above, and an object of the present invention is to effectively regulate distribution of bulk and unsolicited e-mails by using a relatively simple means and at the same time minimize any inconvenience that such regulation may cause to both source and destination mail clients.

To solve the problems discussed above, the present invention provides a mail server comprising: receiving means for receiving an e-mail sent from a source mail client to a destination mail client; e-mail storing means for storing an e-mail received by the receiving means in a storage area assigned to a destination mail client to which the e-mail is addressed; sending means for reading an e-mail stored by the e-mail storing means and sending the e-mail to a destination mail client to which the e-mail is addressed; counting means for counting a number of e-mails sent during a set time period by a source mail client; client information storing means for storing a client identifier assigned to a specific mail client; threshold-exceeded flag storing means for, in a case that a number of e-mails counted for a source mail client exceeds a threshold, storing a threshold-exceeded flag in association with a client identifier assigned to the source mail client; and e-mail managing means for preventing the sending means from sending an e-mail, if a client identifier of a source mail client of the e-mail has been stored by the threshold-exceeded flag storing means in association with a threshold-exceeded flag, and a client identifier of a destination mail client to which the e-mail is addressed has been stored by the client information storing means.

Accordingly, if the number of e-mails sent from a source mail client exceeds the threshold number, e-mails addressed to mail clients whose client identifiers are pre-stored in the client information storing means are disposed of and therefore are not transmitted to those mail clients' addresses. Thus, a mail user who does not wish to receive e-mails from mail users distributing a large number of e-mails can regulate receipt of e-mails by pre-storing a client identifier of his/her mail client in the client information storing unit of the mail server. On the other hand, a mail user who is willing to receive a large number of e-mails for purposes of business communication or e-mail newsletters can receive e-mails without going through a complicated procedure. A mail user who distributes bulk e-mails requests destination mail clients in advance not to pre-store the client identifiers of their mail clients in the client information storing unit.

In one preferred embodiment, the mail server may further comprise period identifier outputting means for outputting a period identifier for identifying the time period, and if the number of the e-mails counted exceeds the threshold, the threshold-exceeded flag storing means may store a period identifier output by the period identifier outputting means in association with the threshold-exceeded flag, and if a period identifier output when an e-mail is received by the period identifier outputting means matches a period identifier stored by the threshold-exceeded flag storing means in association with the threshold-exceeded flag, the e-mail managing means may prevent the sending means from sending the e-mail.

In this embodiment, if a period within which an e-mail has been received matches a period within which a threshold-exceeded flag has been stored the email is disposed of. Consequently, if a threshold-exceeded flag of the previous time period fails to be cleared, a problem caused by the failure can be prevented.

In another preferred embodiment, the mail server may further comprise period identifier outputting means for outputting a period identifier for identifying the time period; and count storing means for storing the number of e-mails counted for a set time period by the counting means in association with a period identifier output at a time of a first count within the set time period by the period identifier outputting means, if a period identifier output when an e-mail is received by the period identifier outputting means does not match a period identifier stored by the count storing means in association with the number of e-mails counted, the counting means may clear the number of the e-mails counted and start to count an e-mail from one, and if both the period identifiers match, the counting means may increase the count number of the e-mails by one.

When a time period is updated, it is necessary to clear an e-mail number which has been counted for the time period. However, if clearing operations are performed as soon as a time period is updated, a heavy load resulting from a concentration of the operations is likely to be imposed on a mail server. In view of the above, if the counting means clears the e-mail number of the previous time period when an e-mail number is newly counted after an update of a time period, the load imposed on the server can be reduced. Another problem is that, since both an e-mail number of the present time period and an e-mail number of the previous time period are stored together, an error in clearing the e-mail number counted may occur. However, according to the present embodiment, an e-mail number is cleared only if a time period within which an e-mail has been received does not match a time period within which a count of an e-mail number has been started. Accordingly, clearing errors can be prevented.

In another preferred embodiment, the mail server may further comprise an error notifying means for, if an e-mail is not sent to a destination mail client for a reason other than a specific reason that the e-mail is disposed of by the mail managing means, sending an error message notifying the reason to a source mail client of the e-mail, and if the e-mail is not sent to the destination mail client for the specific reason, sending an error message notifying a reason different from the specific reason to the source mail client of the e-mail.

According to the present embodiment, since the actual reason why an e-mail has been disposed of is not revealed to a source mail client, transmitting further bulk and unsolicited mail can be prevented. A reason other than the specific reason may be a reason that a storage area assigned to the destination mail client has no space available for storing an e-mail. In this case, if an e-mail is not sent to a destination mail client for the specific reason, the error notifying means sends an error message to a source mail client notifying the reason that the storage area assigned to the destination mail client has no space available.

Also, the present invention provides a mobile communication system comprising: a mail server according to Claim 1; and a wireless network for connecting mobile terminals of mail clients with the mail server.

Also, the present invention provides an e-mail distribution regulating method comprising: storing a service registration flag in association with a client identifier of a mail client to which a predetermined service is provided; receiving an e-mail sent from a source mail client to a destination mail client; storing the received e-mail in a storage area assigned to the destination mail client; increasing a count number of mails by one stored in association with a client identifier assigned to the source mail client; if the counted mail number exceeds a predetermined threshold, storing a threshold-exceeded flag in association with the client identifier of the source mail client; and if the client identifier of the source mail client has been stored in association with a threshold-exceeded flag, and a client identifier of the destination mail client has been stored in association with a service registration flag, preventing distribution of the stored e-mail.

BRIEF DESCRIPTION OF THE DRAWINGS

FIG. 4 is a diagram showing an example of a counter table according to the embodiment.

FIG. 7 is a diagram showing an example of a counter table according to the embodiment.

DETAILED DESCRIPTION OF THE PREFERRED EMBODIMENTS

Description will now be made of one preferred embodiment of the present invention with reference to the attached drawings.

A. Configuration

Figure 1:
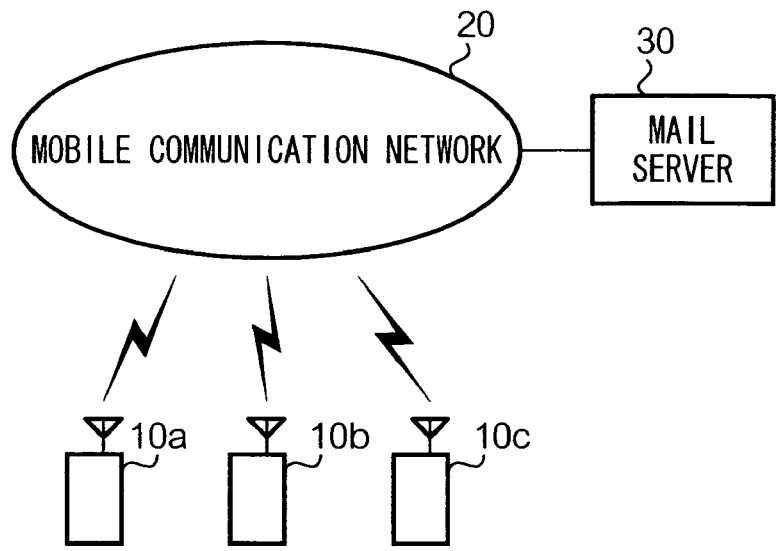
FIG. 1 is a block diagram showing the configuration of the entire system according to an embodiment of the present invention.

FIG. 1 is a block diagram showing the configuration of the entire system according to the present embodiment. As shown in FIG. 1, this system comprises mobile phones 10a to 10c, mobile communication network 20, and mail server 30. Mobile phones 10a to 10c are mobile phones which perform wireless communications, for example, in PDC (Personal Digital Cellular) method, IMT-2000 (International Mobile Telecommunication—2000) method, or PHS (the registered trademark: Personal Handyphone System) method. Mobile phones 10a to 10c store a mail address assigned to each of them for exchange of e-mails, and function as a mail client using the mail address which exchanges e-mails via mobile communication network 20. In FIG. 1, only three mobile phones 10a to 10c are depicted; however, in reality, there exist more mobile phones.

Mobile communication network 20 is a network for providing data communication services or voice communication services to mobile phones 10a to 10c. Mobile communication network 20 comprises base stations, switching centers, and communication lines connecting them (all of which are not shown). In a communication service area of mobile communication network 20, many base stations are located at predetermined spaces, and perform wireless communication with mobile phones 10a to 10c when located in each wireless area of the base stations. Switching centers accommodate a plurality of base stations, and switch lines of mobile phones 10a to 10c located in wireless areas of the base stations.

Mail server 30 is connected to mobile communication network 20, and provides via mobile communication network 20 mail delivery services to mobile phone 10a to 10c. The mail delivery services have a variety of optional services, and in the optional services there is a so called "bulk e-mail sender rejection service". This bulk e-mail sender rejection service is a service aimed at regulating the distribution of bulk and unsolicited e-mails. Specifically, the service regulates, at a mail recipient's request, the distribution of e-mails from mail clients which sends e-mails exceeding a certain threshold a day (in this embodiment, the threshold is assumed to be "100"), and disposes of the e-mails without sending them to a destination (an e-mail recipient). Users, who wish to avail the bulk e-mail sender rejection service, can inform an administrator of mail server 30 accordingly in an appropriate manner regardless of being in an online or offline state.

Figure 2:
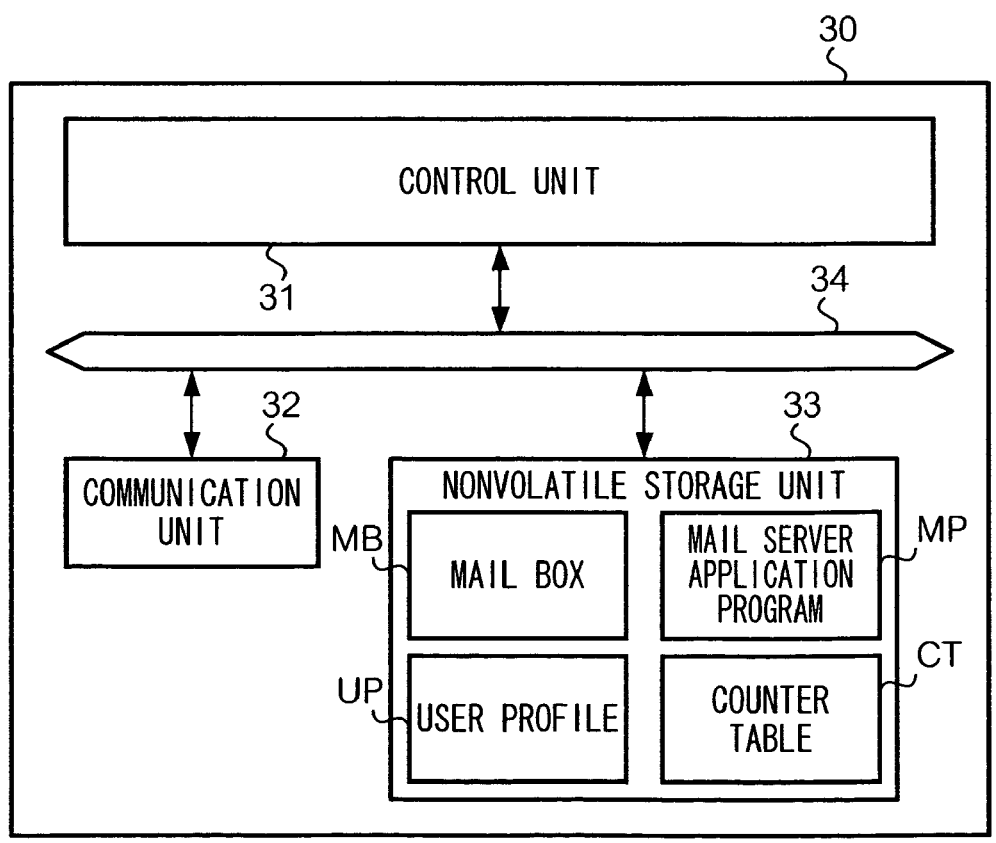
FIG. 2 is a block diagram showing the configuration of a mail server according to the embodiment.

Description will be made of the configuration of mail server 30 with reference to FIG. 2. As shown in FIG. 2, mail server 30 comprises control unit 31, communication unit 32, nonvolatile storage unit 33, and bus 34 interconnecting the above units. Control unit 31 comprises an arithmetic unit such as a CPU (Central Processing Unit) and a variety of memories such as a ROM (Read Only Memory) and a RAM (Random Access Memory). Control unit 31 reads computer programs stored in its own memories or nonvolatile storage unit 33, and by executing the programs, it controls components of mail server 30. Communication unit 32 comprises a connection interface to mobile communication network 20 and a communication control circuit, and performs data communication via mobile communication network 20 under the control of control unit 31.

Nonvolatile storage unit 33 is a large-capacity storage unit such as a hard disk. Nonvolatile storage unit 33 stores mail server application program MP for providing mail delivery services, user profile UP which is data on users of mobile phones 10a to 10c, and counter table CT for counting the number of e-mails to be sent. Nonvolatile storage unit 33 also has storage areas pre-assigned to each of mobile phones 10a to 10c (hereinafter, referred to as "mailbox MB"). Control unit 31, under the control of mail server application program MP, receives an e-mail using communication unit 32, and stores the e-mail in mailbox MB assigned to the destination mobile phone. Subsequently, if control unit 31 calls the mobile phone and receives a response from it, control unit 31 reads the e-mail from mailbox MB, and sends it to the mobile phone using communication unit 32.

Figure 3:
FIG. 3 is a diagram showing an example of a user profile according to the embodiment.

FIG. 3 is a diagram showing an example of data contained in user profile UP. As shown in FIG. 3, user profile UP contains a variety of data such as "Mail Address", "Service Registration Flag", and "User Name" and "Telephone Number" of mobile phones 10a to 10c. "Mail Address" is a mail address assigned to each of mobile phones 10a to 10c, as stated above. "Service Registration Flag" is a flag indicating whether a bulk e-mail sender rejection service is to be provided to each of mobile phones 10a to 10c. If the service is to be provided, a flag is set to the on state. If the service is not to be provided, a flag is set to the off state. A service registration flag is registered according to each user's request. In FIG. 3, the bulk e-mail sender rejection service is to be provided to a mobile phone to which a mail address "matsu@abc.co.jp" is assigned, and the service is not to be provided to a mobile phone to which a mail address "toshi@bc.cojp" is assigned. In addition to the data illustrated in FIG. 3, user profile UP may contain a variety of data such as user attribute information of mobile phones 10a to 10c. However, since such data is irrelevant to the practice of the present invention, detailed descriptions of them will be omitted.

FIG. 4 is a diagram showing an example of data contained in counter table CT.

"Mail Address" as shown in FIG. 4 is a mail address assigned to each of mobile phones 10a to 10c. An "e-mail number" is the number of e-mails sent from mobile phones 10a to 10c. Control unit 31, under the control of mail server application program MP, when receiving an e-mail from either of mobile phones 10a to 10c via mobile communication network 20, refers to a source mail address designated in the "FROM" field of the e-mail, and counts up the e-mail number by one which is contained in counter table CT in association with the source mail address.

"E-mail Number Count Start Day Identifier" as shown in FIG. 4 is an identifier of a day of the week when a count of an e-mail number has been started. A correspondence between a day of the week and a day identifier is shown in Table 1.

TABLE 1

| | A day of the week | | | | | | |
|---|---|---|---|---|---|---|---|
| | Sun. | Mon. | Tue. | Wed. | Thu. | Fri. | Sat. |
| Day Identifier | 0 | 1 | 2 | 3 | 4 | 5 | 6 |

Mail server application program MP includes a clocking program for calculating the current time and day of the week, and a function which returns a day identifier corresponding to an entered day of the week (hereinafter, referred to as "day function"). Control unit 31 enters a day of the week calculated using the clocking program into the day function to obtain the corresponding day identifier, and writes it in counter table CT.

In the present embodiment, an e-mail number is counted by the day. Accordingly, with the change of the date (in other words, after a lapse of clock-time 24:00), it is necessary to clear an e-mail number which has been counted on the previous day and reset it to "0". However, if clearing operations are performed as soon as a lapse of clock-time 24:00, a heavy load resulting from a concentration of the operations is placed on control unit 31. In view of the above, in the present embodiment, when an e-mail number is newly counted after the change of the date, an e-mail number of the previous day is cleared. As a result, since a clearing operation is performed individually on the basis of a description field of "E-mail Number", it becomes possible to avoid the operation concentration problem stated above. For example, when control unit 31 receives a first e-mail after the change of the date from a mobile phone to which a mail address "matsu@abc.co.jp" of FIG. 4 is assigned, control unit 31 clears an e-mail number of the previous day corresponding to the mail address "matsu@abc.co.jp", and makes a fresh count of an e-mail number beginning with "1".

However, counter table CT is to contain both, an e-mail number of the day and an e-mail number of the previous day. For example, an e-mail number of the day corresponding to a mail address "matsu@abc.co.jp" is counted on the day, while an e-mail number corresponding to a mail address "toshi@abc.co.jp" is counted on the previous day. For this reason, control unit 31 stores an e-mail number count start day identifier, and compares the stored day identifier with the day identifier of a day when an e-mail is received. If both of the day identifiers do not match, control unit 31 clears an e-mail number and starts to count an e-mail number from "1". On the other hand, if both day identifiers match, control unit 31 increases the count of an e-mail number by one. For example, since a mail address "kei@abc.co.jp" of FIG. 4 is stored in association with a day identifier "3" (Wednesday), when control unit 31 receives an e-mail on Thursday (a day identifier "4") from a mobile phone to which the mail address "kei@abc.co.jp" is assigned, control unit 31 clears an e-mail number "15" and a day identifier "3", and writes a new e-mail number "1" and a day identifier "4" because the two day identifiers do not match. On the other hand, since a mail address "matsu@abc.co.jp" is stored in association with a day identifier "4" (Thursday), when control unit 31 receives an e-mail on Thursday (a day identifier "4") from a mobile phone to which the mail address "matsu@abc.co.jp" is assigned, control unit 31 determines that both day identifiers match, and adds "1" to an e-mail number "99" to write an e-mail number "100". Consequently, an error in clearing an e-mail number can be prevented.

"Threshold-Exceeded Flag" as shown in FIG. 4 is a flag which is set to the on state when an e-mail number reaches a threshold "100". In FIG. 4, since 250 e-mails have been sent from a mobile phone to which a mail address "toshi@abc.co.jp" is assigned, the threshold-exceeded flag corresponding to the mobile phone is on. On the other hand, since more than 100 e-mails have not been sent from other mobile phones, the threshold-exceeded flag corresponding to the other mobile phones is not on.

"Threshold-Exceeded Flag Setting Day Identifier" is an identifier of a day of the week when a threshold-exceeded flag has been set to the on state. When a threshold-exceeded flag corresponding to a certain mail address is set to the on state, control unit 31 enters a day of the week calculated using the clocking program into the day function to obtain the corresponding day identifier, and writes it in counter table CT. A threshold-exceeded flag, with the change of the date, needs to be set from the on state set on the previous day to the off state. A threshold-exceeded flag is for regulating the distribution of e-mails so that the e-mails do not arrive at a destination. Therefore, an error in the setting of a threshold-exceeded flag should never occur.

In view of the above, assuming there is a possible error in the clearing operation, by writing in counter table CT a day identifier of a day when a threshold-exceeded flag has been set to the on state, the present embodiment makes it possible to distinguish between threshold-exceeded flags set before the previous day and threshold-exceeded flags set on the day. For example, in FIG. 4, a threshold-exceeded flag corresponding to a mail address "toshi@abc.co.jp" is on, and the day identifier is "4" (Thursday). Accordingly, if control unit 31 receives an e-mail on Thursday (a day identifier "4") from a mobile phone to which the mail address "toshi@abc.co.jp" is assigned, control unit 31 can determine that it may dispose of the e-mail, because both day identifiers match and the threshold-exceeded flag has been set on the basis of an e-mail number of the day.

B. Operation

Description will be made of operations of the embodiment having the configuration stated above.

Figure 5:
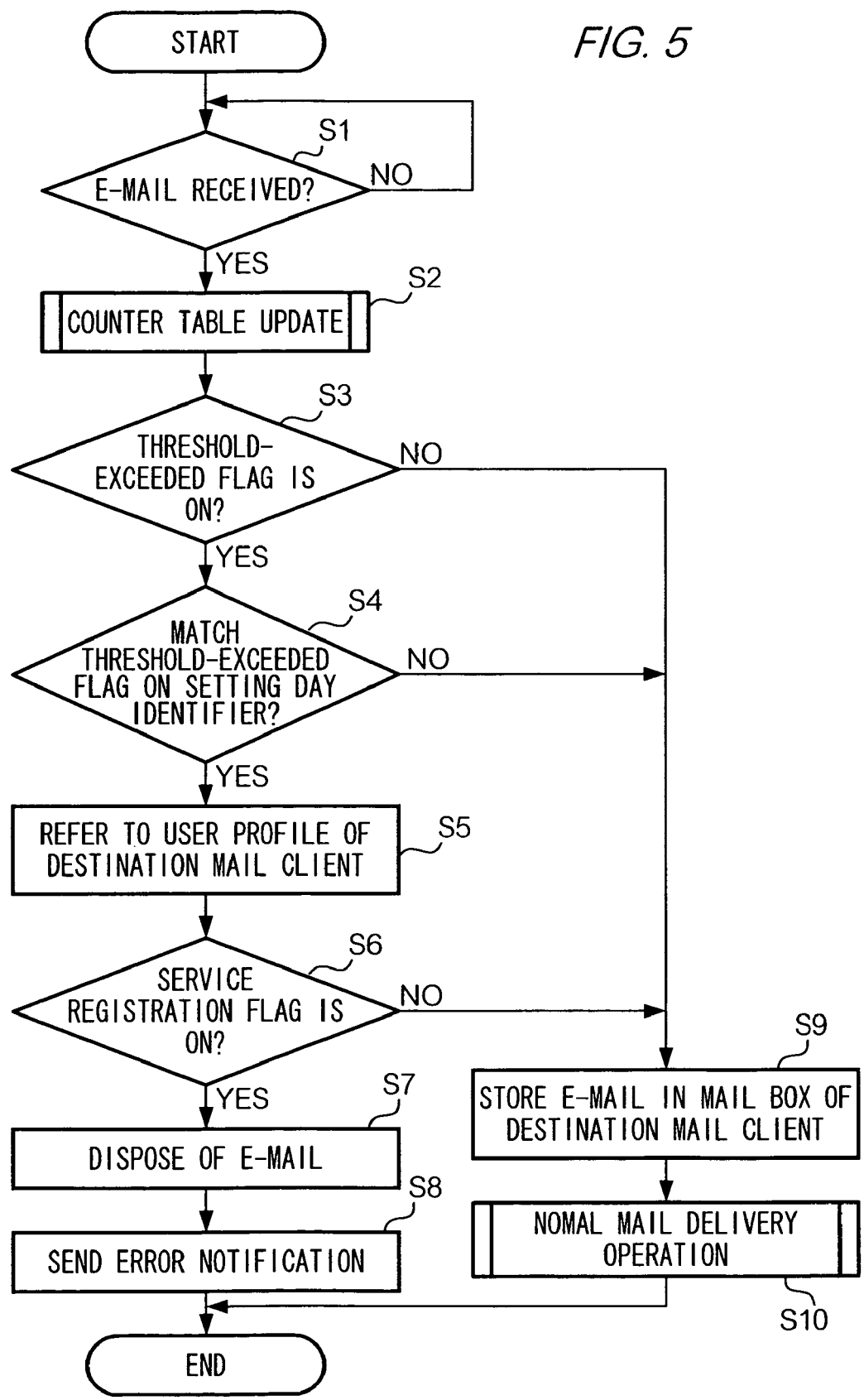
FIG. 5 is a flowchart illustrating operations of a control unit of the mail server according to the embodiment.
Figure 6:
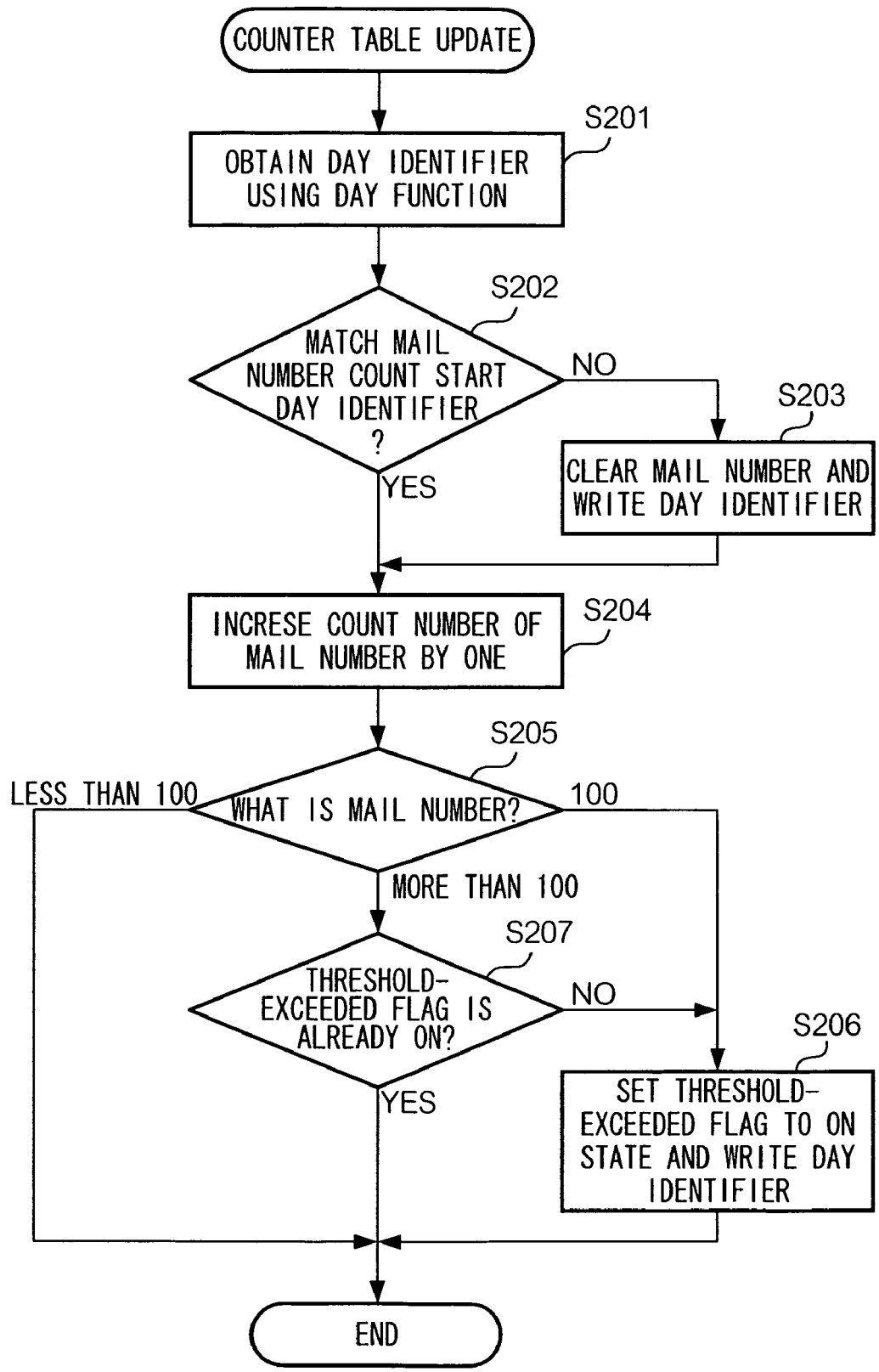
FIG. 6 is a flowchart illustrating operations of the control unit of the mail server according to the embodiment.

FIGS. 5 and 6 are flowcharts illustrating operations when control unit 31 executes mail server application program MP. With reference to FIGS. 5 and 6, a case will be described where an e-mail is sent on Thursday from a mobile phone to which a mail address "matsu@abc.co.jp" is assigned (mobile phone 10*a*) to a mobile phone to which a mail address "kei@abc.co.jp" is assigned (mobile phone 10*b*). The contents of user profile UP and counter table CT at the start of the operations are shown in FIGS. 3 and 4.

As shown in FIG. 5, control unit 31, when receiving an e-mail from mobile phone 10*a* via mobile communication network 20 (Step S1; Yes), refers to a mail address "matsu@abc.co.jp" designated in the "FROM" field of the e-mail, and updates counter table CT (Step S2).

This table update operation is performed as shown in the flowchart of FIG. 6. Control unit 31 enters a day of the week calculated using the clocking program (Thursday) into the day function to obtain the corresponding day identifier "4" (Step S201). Control unit 31 determines whether the day identifier "4" matches the e-mail number count start day identifier stored in association with the mail address "matsu@abc.co.jp" in counter table CT of FIG. 4. In this case, since both day identifiers match (Step S202; Yes), control unit 31 increases by one the e-mail number stored in association with the mail address "matsu@abc.co.jp" in counter table CT (Step S204). Consequently, the e-mail number is updated from "99" to "100", and reaches the threshold "100" (Step S205; 100). Control unit 31 updates the threshold-exceeded flag of counter table CT from off to on, and writes a threshold-exceeded flag setting day identifier "4" (Step S206). As a result, the contents of counter table CT of FIG. 4 are updated as shown in FIG. 7.

In Step S202, if both day identifiers do not match (Step S202; No), which means that the count was made the first time on Thursday, control unit 31 clears the e-mail number corresponding to the mail address "matsu@abc.co.jp", and writes a new e-mail number "1". Control unit 31 also clears the day identifier stored in counter table CT, and writes a new day identifier "4" (Step S203).

In Step S205, if an e-mail number exceeds the threshold "100", control unit 31, after confirming that the threshold-exceeded flag is on (Step S207), ends the table update operation. In Step S207, if the threshold-exceeded flag is off (Step S207; No), control unit 31 updates the threshold-exceeded flag from off to on (Step S206), writes a day identifier, and ends the table update operation.

Following operation of control unit 31 proceeds to Step S3 of FIG. 5.

In Step S3, control unit 31 confirms whether the threshold-exceeded flag stored in association with the mail address "matsu@abc.co.jp" in counter table CT is on. In this case, the threshold-exceeded flag is on as shown in FIG. 7 (Step S3; Yes), control unit 31 determines whether the day identifier "4" obtained in Step S201 matches the threshold-exceeded flag setting day identifier corresponding to the mail address "matsu@abc.co.jp" (Step S4). In this case, both day identifiers match as shown in FIG. 7 (Step S4; Yes), control unit 31 refers to the service registration flag stored in association with the mail address "kei@abc.co.jp" in user profile UP (Step S5). In this case, the service registration flag is on as shown in FIG. 3 (Step S6; Yes), control unit 31 disposes of the received e-mail instead of storing it in mailbox MB corresponding to the mail address "kei@abc.co.jp" (Step S7). Consequently, the e-mail is not sent from mail server 30 to mobile phone 10*b* of the destination mail client. After that, control unit 31 sends an error notification to mobile phone 10*a* which has sent the e-mail (Step S8).

This error notification includes a message "mailbox full", which is the same as that of an error notification used in a case when mailbox MB assigned to a destination mobile phone is full and has no space available for a newly received e-mail. If a sender of an e-mail is a malicious user, since he/she is expected to wish to send unsolicited bulk e-mails to the same person repeatedly, he/she should wish to know mail clients to which he/she can send unsolicited bulk e-mails without being blocked by mail server 30. However, since an error notification is returned to a sender as stated above, the sender cannot determine whether the error notification has been returned because the destination user is operating the bulk e-mail sender rejection service for unsolicited mail or because mailbox MB is in fact full. Consequently, information for identifying mail clients to which bulk and unsolicited e-mails can be sent is not provided to a malicious user, which contributes to the prevention of the spread of unsolicited bulk e-mails.

If in Step S3 the threshold-exceeds flag is off (Step S3; No), if in Step S4 both day identifiers do not match (Step S4; No), or if in Step S6 the service registration flag is off (Step S6; No), control unit 31 stores the received e-mail in mailbox MB assigned to the destination mobile phone (Step S9), and performs a usual mail delivery operation (Step S10).

According to the present embodiment stated above, if the number of e-mails sent from a certain mobile phone exceeds a threshold, only e-mails large number of e-mails can regulate the distribution of e-mails by applying for a bulk mail sender rejection service and pre-storing the mail address of his/her mobile phone in mail server 30. On the other hand, a user who is willing to receive a large number of e-mails for purposes of business communication or e-mail newsletters can receive e-mails without going through any procedure. A user who distributes a large number of e-mails needs to inform destination users not to apply for a bulk mail sender rejection service.

C. Modifications

The present invention can be implemented in embodiments such as the following other than the embodiments stated above.

(1) A bulk mail sender rejection service may be intended for, instead of a mobile phone as in the embodiment stated above, a mail client such as a personal computer exchanging e-mails via a network such as the Internet. Since the mail address of an e-mail exchanged by mobile phones via a mobile communication network is associated with a telephone number which is an identifier unique to each mobile phone, it is generally difficult to falsify a mail address. For the above reason, it is most preferable that the present invention where an e-mail number is counted on the basis of a source mail address is implemented using a mobile communication network.

(2) A mail server may be composed of a plurality of devices instead of one server. A time period for counting e-mails instead of being a single day may be, several hours, one week, or an even longer time period. Also, a time period for counting e-mails may be identified on the basis of a date instead of a day of the week.

(3) A threshold used for the judgment of a bulk e-mail sending may be more or less than "100". An optimum threshold is determined in due consideration of a variety of factors such as the total number of users, the degree of the diffusion of a mail delivery service, or the degree of the spreading of unsolicited bulk e-mails. Also, a threshold may be set by a recipient user freely. In this case, a user notifies an administrator of a mail server of a desired threshold in advance. A mail server may store different thresholds for each user (a mail client), and each time it sends an e-mail to a destination mail client, it compares the threshold stored in association with the destination mail client with an e-mail number of the source mail client to determine whether to regulate the distribution of the e-mail. A method of handling e-mails which exceed a threshold is not limited to the method of disposing of e-mails without storing them in a mailbox as in the embodiment stated above. In essence, any method can be adapted which prevents a mail server from sending such an e-mail to a destination mail client.

(4) An error notification may be one other than a notification of a "mailbox full" message described in the embodiment stated above. In essence, any error notification method can be adapted which would prevent a source user of an e-mail from knowing the true reason why the sending of the e-mail has been rejected (i.e. a reason that the source user has sent a large number of e-mails for a certain time period). Accordingly, other common error messages may be used instead of the error message "mailbox full".

(5) The above-mentioned programs executed in mail server 30 may be read and executed by control unit 31 from a recording medium such as a magnetic tape, a magnetic disk, a floppy disk, an optical recording medium, a magneto-optical recording medium, a DVD, a RAM.

The invention claimed is:

1. A mail server for preventing sending of e-mail from a source mail client to a destination mail client, the mail server comprising:
    client information storing means for storing a client identifier assigned to a specific destination mail client in association with an e-mail threshold service identifier, the e-mail threshold service identifier indicative of whether the specific destination mail client subscribes to an e-mail threshold-exceed service;
    receiving means for receiving an e-mail sent from a specific source mail client to the specific destination mail client;
    counting means for counting a number of e-mails sent by the specific source mail client during a set time period;
    threshold-exceeded flag storing means for, in a case that the number of e-mails counted for the specific source mail client exceeds a threshold, storing a threshold-exceeded flag in association with a client identifier assigned to the specific source mail client;
    period identifier outputting means for outputting a period identifier indicative of a specific time period;
    e-mail managing means for preventing to send the e-mail, wherein if the number of the e-mails counted for the specific source mail client exceeds the threshold for the specific time period, the threshold-exceeded flag storing means stores the period identifier output by the period identifier outputting means in association with the threshold-exceeded flag; and
    wherein the e-mail managing means prevents sending the email
        if the threshold-exceeded flag stored in association with the client identifier of the specific source mail client indicates that the threshold has been exceeded,
        if the e-mail threshold service identifier of the specific destination mail client indicates that the specific destination mail client subscribes to the e-mail threshold-exceed service, and
        if a period identifier output, indicative of a time period when the e-mail is received, by the period identifier outputting means matches the period identifier stored by the threshold-exceeded flag storing means in association with the threshold-exceeded flag.

2. A mail server for preventing sending of e-mail from a source mail client to a destination mail client, the mail server comprising:
    client information storing means for storing a client identifier assigned to a specific destination mail client in association with an e-mail threshold service identifier, the e-mail threshold service identifier indicative of whether the specific destination mail client subscribes to an e-mail threshold-exceed service;
    receiving means for receiving an e-mail sent from a specific source mail client to the specific destination mail client;
    counting means for counting a number of e-mails sent by the specific source mail client during a set time period;
    threshold-exceeded flag storing means for, in a case that the number of e-mails counted for the specific source mail client exceeds a threshold, storing a threshold-exceeded flag in association with a client identifier assigned to the specific source mail client;
    period identifier outputting means for outputting a period identifier indicative of a specific time period;
    e-mail managing means for preventing the sending means from sending the e-mail if the threshold-exceeded flag stored in association with the client identifier of the specific source mail client indicates that the threshold has been exceeded and if the e-mail threshold service identifier of the specific destination mail client indicates that the specific destination mail client subscribes to the e-mail threshold-exceed service; and
    count storing means for storing the number of e-mails counted for the set time period by the counting means in association with a period identifier output at a time of a first count within the set time period by the period identifier outputting means,
    wherein
    if the period identifier output indicative of a time period when the e-mail is received by the period identifier outputting means does not match the period identifier stored by the count storing means in association with the number of e-mails counted, the counting means clears the number of the e-mails counted and starts to count an e-mail from one, and if both the period identifiers match, the counting means increases the count number of the e-mails by one.

3. The mail server of claim 1 further comprising:

e-mail storing means for storing an e-mail received by the receiving means in a storage area assigned to a destination mail client to which the e-mail is addressed;

sending means for reading an e-mail stored by the e-mail storing means and sending the e-mail to a destination mail client to which the e-mail is addressed; and an error notifying means for, if the e-mail is not sent to a destination mail client for a reason other than a specific reason that the e-mail is disposed of by the mail managing means, sending an error message notifying the reason to a source mail client of the e-mail, and if the e-mail is not sent to the destination mail client for the specific reason, sending an error message notifying a reason different from the specific reason to the source mail client of the e-mail.

4. A mail server according to claim 3, wherein:

a reason other than the specific reason is a reason that a storage area assigned to the destination mail client has no space available for storing an e-mail; and if the e-mail is not sent to the destination mail client for the specific reason, the error notifying means sends an error message to the source mail client notifying the reason that the storage area assigned to the destination mail client has no space available.

5. A method for preventing sending of e-mail from a source mail client to a destination mail client, the method comprising:

storing a client identifier assigned to a specific destination mail client in association with an e-mail threshold service identifier, the e-mail threshold service identifier indicative of whether the specific destination mail client subscribes to an e-mail threshold-exceed service;

receiving an e-mail sent from a specific source mail client to the specific destination mail client;

counting a number of e-mails sent by the specific source mail client during a set time period;

if the number of e-mails counted for the specific source mail client exceeds a threshold, storing a threshold-exceeded flag in association with a client identifier assigned to the specific source mail client;

outputting a period identifier indicative of a specific time period;

if the number of the e-mails counted for the specific source mail client exceeds the threshold for the specific time period, storing the period identifier output in association with the threshold-exceeded flag; and preventing the sending of the email:

if the threshold-exceeded flag stored in association with the client identifier of the specific source mail client indicates that the threshold has been exceeded, if the e-mail threshold service identifier of the specific destination mail client indicates that the specific destination mail client subscribes to the e-mail threshold-exceed service, and if a period identifier output indicative of a time period when the e-mail is received matches the period identifier stored in association with the threshold-exceeded flag.

6. A method for preventing sending of e-mail from a source mail client to a destination mail client, the method comprising:

storing a client identifier assigned to a specific destination mail client in association with an e-mail threshold service identifier, the e-mail threshold service identifier indicative of whether the specific destination mail client subscribes to an e-mail threshold-exceed service;

receiving an e-mail sent from a specific source mail client to the specific destination mail client;

counting a number of c-mails sent by the specific source mail client during a set time period;

if the number of c-mails counted for the specific source mail client exceeds a threshold, storing a threshold-exceeded flag in association with a client identifier assigned to the specific source mail client;

outputting a period identifier indicative of a specific time period;

preventing the sending of the e-mail if the threshold-exceeded flag stored in association with the client identifier of the specific source mail client indicates that the threshold has been exceeded and if the e-mail threshold service identifier of the specific destination mail client indicates that the specific destination mail client subscribes to the e-mail threshold-exceed service;

count storing means for storing the number of c-mails counted for the set time period by the counting means in association with a period identifier output at a time of a first count within the set time period by the period identifier outputting means;

if the period identifier output indicative of a time period when the e-mail is received does not match the period identifier stored in association with the number of e-mails counted, assigning to the number of the e-mails counted a value indicative of one; and if both the period identifiers match, increasing the count number of the e-mails by one.

7. The method of claim 5 further comprising sending an error message to the specific source mail client, wherein if the e-mail is not sent to the destination mail client for a reason other than a specific reason that the e-mail is disposed of because the threshold-exceeded flag indicates the threshold has been exceeded, the error message notifying the reason to the specific source mail client of the e-mail, and wherein if the e-mail is not sent to the destination mail client for the specific reason, the error message notifying a reason different from the specific reason to the specific source mail client of the e-mail.

8. The method according to claim 7, wherein:

a reason other than the specific reason is a reason that a storage area assigned to the destination mail client has no space available for storing the e-mail; and if the e-mail is not sent to the destination mail client for the specific reason, sending the error message to the specific source mail client notifying the reason that the storage area assigned to the specific destination mail client has no space available.

* * * * *

UNITED STATES PATENT AND TRADEMARK OFFICE
CERTIFICATE OF CORRECTION

PATENT NO. : 7,590,697 B2 Page 1 of 1
APPLICATION NO. : 10/978620
DATED : September 15, 2009
INVENTOR(S) : Ito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Twenty-first Day of September, 2010

David J. Kappos
*Director of the United States Patent and Trademark Office*